United States Patent
Griffin

(10) Patent No.: US 11,133,942 B1
(45) Date of Patent: Sep. 28, 2021

(54) SYSTEMS AND METHODS OF RING USAGE CERTIFICATE EXTENSION

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 208 days.

(21) Appl. No.: 16/413,351

(22) Filed: May 15, 2019

(51) Int. Cl.
*H04L 29/06* (2006.01)
*H04L 9/32* (2006.01)

(52) U.S. Cl.
CPC .......... *H04L 9/3265* (2013.01); *H04L 9/3255* (2013.01); *H04L 9/3268* (2013.01); *H04L 2209/38* (2013.01)

(58) Field of Classification Search
CPC ... H04L 9/3265; H04L 9/3255; H04L 9/3268; H04L 2209/38
See application file for complete search history.

(56) References Cited

U.S. PATENT DOCUMENTS

| | | | | |
|---|---|---|---|---|
| 6,021,202 A * | 2/2000 | Anderson | .............. | G06Q 30/06 705/54 |
| 6,029,150 A * | 2/2000 | Kravitz | .................. | G06Q 20/02 705/39 |
| 6,292,897 B1 | 9/2001 | Gennaro et al. | | |
| 7,177,839 B1 * | 2/2007 | Claxton | ................. | G06Q 20/12 705/44 |
| 9,888,037 B1 * | 2/2018 | Sharifi Mehr | ........ | H04L 63/205 |
| 10,454,689 B1 * | 10/2019 | Sharifi Mehr | ........ | H04L 63/166 |
| 2002/0029200 A1 * | 3/2002 | Dulin | ..................... | G06Q 20/02 705/67 |
| 2002/0162002 A1 * | 10/2002 | Gunter | .................... | G06F 21/33 713/176 |
| 2003/0233542 A1 | 12/2003 | Benaloh | | |
| 2007/0277013 A1 * | 11/2007 | Rexha | ................ | G06Q 20/3823 711/164 |
| 2013/0254535 A1 * | 9/2013 | Akehurst | ............ | H04L 63/0435 713/158 |
| 2016/0261404 A1 | 9/2016 | Ford et al. | | |
| 2016/0358165 A1 | 12/2016 | Maxwell | | |
| 2018/0234409 A1 * | 8/2018 | Nelson | .................. | H04L 9/3257 |

\* cited by examiner

*Primary Examiner* — Carl G Colin
*Assistant Examiner* — Hany S. Gadalla
(74) *Attorney, Agent, or Firm* — Foley & Lardner LLP

(57) ABSTRACT

Systems and methods for using ring usage certificate extensions are described. Some implementations described limit the ability of signers using a 'ring signature' from using public key certificates to create the ring signatures without the permission of the creators of those respective public key certificates. An implementation may describe receiving a request to validate, receiving a plurality of digital certificates associated with the request to validate, determining the request to validate requires validation of a ring signature using the plurality of digital certificates, determining one or more of the plurality of digital certificates comprises a ring usage certificate extension, analyzing the ring usage certificate extension to retrieve a value associated with the ring usage certificate extension, and failing validation of the request based on determining the request to validate requires validation of the ring signature and based on the value associated with the ring usage certificate extension.

20 Claims, 4 Drawing Sheets

SYSTEMS AND METHODS OF RING USAGE CERTIFICATE EXTENSION

BACKGROUND

There are many different types of digital signature schemes and each type has its own characteristics, usage benefits, and drawbacks. Some of these signature schemes can be described as anonymous digital signature schemes and they all differ in some way from what may be described as more traditional signatures associated with X.509 digital certificates and the SignedData type defined in the Cryptographic Message Syntax (CMS) standards widely used by businesses (X9.73), in the IETF to implement secure electronic mail, or X.894 that standardizes CMS for the telecommunications industry.

SUMMARY

Various implementations relate to a certificate authority system including a network interface circuit and a certificate circuit. The network interface circuit may be configured to receive a request to validate and receive a plurality of digital certificates associated with the request to validate. The certificate circuit may be configured to determine the request to validate requires validation of a ring signature using the plurality of digital certificates, determine one or more of the plurality of digital certificates includes a ring usage certificate extension, analyze the ring usage certificate extension to retrieve a value associated with the ring usage certificate extension, and fail validation of the request based on determining the request to validate requires validation of the ring signature and based on the value associated with the ring usage certificate extension. In some implementations, determining that one or more of the plurality of digital certificates includes the ring usage certificate extension may be done by determining the one or more of the plurality of digital certificates includes an extension, determining the extension includes an identification label identifying the extension as the ring usage certificate extension, and determining the extension further includes an associated Boolean value. In some implementations, the extension includes a second Boolean value identifying the extension as critical for processing. In some implementations, the network interface circuit is further configured to transmit an indication of the failed validation to a computing system associated with a requestor of the request to validate. In some implementations, the indication of the failed validation includes information that the failed validation was associated with the ring usage certificate extension of one or more of the plurality of digital certificates. In some implementations, the certificate circuit is configured to store a log entry of the failed validation, the log entry including data associated with the request and the one or more of the plurality of digital certificates including the ring usage certificate extension. In some implementations, the validation would be successful as a ring signature except for the analysis of the ring usage certificate extension.

In some implementations, analyzing the ring usage certificate extension to retrieve a value associated with the ring usage certificate extension includes retrieving a yes/no value associated with the ring usage certificate extension. In some implementations, analyzing the ring usage certificate extension to retrieve a value associated with the ring usage certificate extension includes retrieving an allow-ring/disallow ring associated with the ring usage certificate extension. In some implementations, if the extension is not identified as critical, then some entities may choose to ignore the extension during processing. In some implementations, determining that one or more of the plurality of digital certificates includes the ring usage certificate extension may be done by determining the one or more of the plurality of digital certificates includes an extension, determining the extension includes an identification label identifying the extension as the ring usage certificate extension, and determining the extension further includes an associated Boolean value, the Boolean value indicating the certificate can or cannot be used in a ring signature.

Other implementations relate to a method. The method may be executing on a certificate authority system. The method may include receiving a request to validate, receiving a plurality of digital certificates associated with the request to validate, determining the request to validate requires validation of a ring signature using the plurality of digital certificates, determining one or more of the plurality of digital certificates includes a ring usage certificate extension, analyzing the ring usage certificate extension to retrieve a value associated with the ring usage certificate extension, and failing validation of the request based on determining the request to validate requires validation of the ring signature and based on the value associated with the ring usage certificate extension. In some implementations, determining that one or more of the plurality of digital certificates includes the ring usage certificate extension may be done by determining the one or more of the plurality of digital certificates includes an extension, determining the extension includes an identification label identifying the extension as the ring usage certificate extension, and determining the extension further includes an associated Boolean value. In some implementations, the extension includes a second Boolean value identifying the extension as critical. In some implementations, the method further includes transmitting an indication of the failed validation to a computing system associated with a requestor of the request to validate. In some implementations, the indication of the failed validation includes information that the failed validation was associated with the ring usage certificate extension of one or more of the plurality of digital certificates. In some implementations, the method further includes storing a log entry of the failed validation, the log entry including data associated with the request and the one or more of the plurality of digital certificates including the ring usage certificate extension. In some implementations, the validation is successful as a ring signature except for the analysis of the ring usage certificate extension.

Other implementations relate to non-transitory computer-readable storage media storing instructions that are executable by one or more processors to perform operations including one or more of the above methods.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
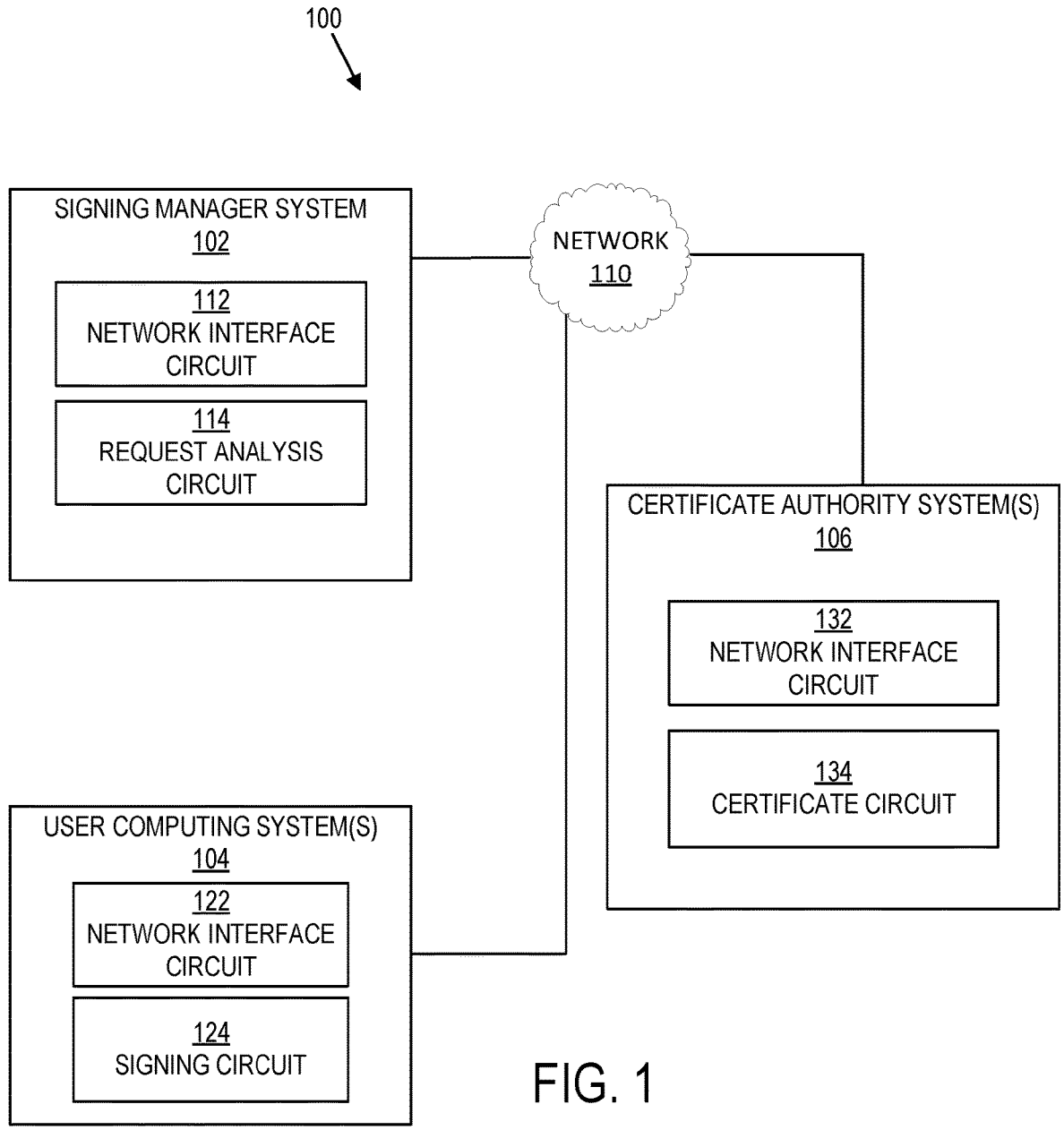
FIG. 1 is a schematic diagram of a ring usage certificate extension system, according to an example implementation.

Systems and methods are described for using ring usage certificate extensions. The ISO/IEC 200087 standard specifies two categories of mechanisms that provide anonymous digital signatures. One category verifies signatures using a single group public key. The other category verifies signatures using a set of public keys, including the public key of the actual signer. The first category is referred to as group signatures and the second as ring signatures. In some implementations, systems and methods are described that limit the ability of signers using a 'ring signature' from using public key certificates to create the ring signatures without the permission of the creators of those respective public key certificates.

A ring signature may be a type of digital signature that can be performed by any member of a group of users that each have their own public and private keys. Therefore, a message signed with a ring signature is endorsed by someone in a particular group of people. One feature of a ring signature may be that it should be computationally infeasible to determine which of the group members' keys was used to produce the signature. Ring signatures are similar to group signatures but differ in two key ways: there is no way to revoke the anonymity of an individual signature, and any group of users can be used as a group without additional setup. In some cases, a user, as mentioned, can be included in the group of users without knowledge or consent. One or more implementations of the present concept allow one or more signers in a ring signature scheme to set an extension of a certificate with their respective public key that would affect consent to a message by another member of the ring signature scheme. A certificate extension may indicate, for example, whether the certificate is "true" (e.g., consent) or "false" (e.g., no consent/flagged). As ring signatures have many variations, the use of the current concept in any examples or implementations should not be construed as a limitation of the concept to those implementations.

In ordinary signature verification, the signer's public key reveals the signer's unique information. Therefore, an ordinary signature does not provide signer anonymity. For ring signatures, signature verification uses a set of public keys, each binding to one potential signer. Here the level of anonymity provided is dependent on the size of the public key set. For group and Direct Anonymous Attestation (DAA) signature verification, which makes use of a group public key, the level of anonymity is dependent on the size of the group. In some implementations, in ring signatures there is no group manager and it should only be possible to determine the identity of the ring signer from self-disclosure. As there may be no group setup procedure, ring signature schemes can be initiated at any time. Signers only require the private key of the actual signer and the public keys of an arbitrary set of the possible signers (i.e., the non-signers) that includes the public key of the signer. The non-signer public keys are chosen by the signer to form a ring.

These implementations abrogate the consent issues with the use of public keys of others in ring signature signing. In other words, the problem of anyone trying to digitally sign information while obscuring their identity, where the person can use their public and private key pair and also the public keys of any number of other people or organizations, without asking permission, and involve them in the signing of the information. For example, if the information involved is associated with or something illegal, unethical, immoral, etc., the identity of those any number of other people may be associated with the release of the information against their wishes and without their consent. While some digital certificates contain only public keys and other public information, their use in creating and verifying signatures on signed objects can expose institutions to risk, even when the associated private keys are not exposed. Unauthorized parties can use the institution's public keys to create ring signatures that allow these parties to sign content without the permission or knowledge of the public key certificate subject. In a rig signature scheme, a set of public keys, including the public key of the signer, and a single private signing key are used to mask the identity of the one true signer. In these types of public key certificates, the public key certificate can be appropriated by the signer without permission and used for this purpose. A mechanism is needed and is presented in the described systems and methods to prevent digital certificates from being used for validation of ring signatures that include public keys that are associated with users and organizations that have explicitly not consented to participate in such ring signatures.

These implementations further solve the technical problem of preventing the use of ring signatures from allowing the use of public keys in the digital certificates associated with an individual or organization without its permission by, in some implementations, defining a ring usage certificate extension that when set to FALSE and flagged as a critical certificate (e.g., a critical X.509 certificate) extension can force unauthorized ring signatures to be rejected by signed message recipients during standard certificate verification and path validation processing. Digital certificates are used within some institutions to authenticate the identities of devices, employees, business partners, regulators, etc. Cryptographic keys associated with Digital Certificates may be used to sign ordinary email, create electronic signatures that comply with ESIGN and UETA requirements, sign transactions or smart contracts in blockchain or other Distributed Ledger Technology (DLT) environments, or enable entity authentication. All these activities expose the subject public key included in these digital certificates to unintended uses, such as use as non-signer in a ring signature. The growing interest of the blockchain and DLT communities in ring signatures for anonymous signing may expose institutions to risk of being a participant in unsavory or illegal activities. Inclusion of the public key certified as having the institution's identifier could subject the institution to loss of reputation or legal and regulatory risk that could harm the institution. For example, when the ring usage certificate extension as described herein is signed by a certificate issuing authority (CA), evidence is provided to the organization that any attempts to use the public keys in the certificate by a ring signer for all activities, including those that are prohibited by law, regulations, or sanctions, constitute use that is unauthorized by the subject and organization associated with the certificate. In other words, the ring usage certificate extension prevents public key digital certificates that are intended only for non-anonymous, single subject public key signing from being used by ring signers without permission of the subject, the associated organization, or the issuing certificate authority (CA).

Referring generally to the figures, systems, and methods, ring usage certificate extensions may be used in a public key infrastructure (PKI), by virtue of the public certificates that are used. In some implementations, PKI entities are able to verify each signature that is part of a ring signature to validate the trustworthiness of the respective signature by verifying that each can be traced back to a trusted group. In other words, to verify that each respective signature certificate is not expired and not on the certification revocation list in order to treat the ring signature as valid. In some implementations, verification includes use of a critical extension. In some implementations, the extension type has one or more critical fields, including a field indicating whether or not the certificate can be used in a ring signature (e.g., a Boolean flag). In some implementations, an X.509 compliant PKI must understand how to process this certificate extension or fail that piece of the path validation. In some implementations, the systems and methods described differ from complex "semantic extensions" to X.509 certificates that seek support for ring, group, and traceable signatures. Instead, the systems and methods seek to prevent currently used public key digital certificates that are intended only or non-anonymous, single subject public key signing from being used by ring signers without permission of the subject, the associated organization, or the issuing CA. Further, unlike semantic extensions to X.509 certificates, the systems and methods described seek to provide evidence to the certificate subject, associated organization, and CA that use of the certified public keys in ring signature schemes are unauthorized by these parties. Ring signature schemes allow a ring signer to use the public keys of others in the digital certificates associated with an organization without their permission. Ring signers can anonymously conduct business with any party and sign content of any kind while forcing the organization to participate. This feature of ring signatures allows an anonymous signer to involve an organization's digital certificate subjects as unwitting participants in unlawful activities (e.g., illicit arms sales, money laundering, drug trade and human trafficking, etc.) without the permission of the subject or their organization In some implementations, for ring usage certificate extensions, a certificate extension would allow a processing PKI to not allow the signature to be used for a ring signature certificate by looking at the critical flag in the extension that must be processed. The PKI may determine if the payload of the critical flag indicates that the certificate cannot be used as a ring signature and fail path validation. In some implementations, where the PKI compliant system does not know how to process the critical certificate extension, would fail the path validation for failure to process the critical flag. In some implementations, the PKI compliant system may ignore, correctly or incorrectly, the critical extension flag for one or more reasons and validate the certificate and use it as part of a ring signature, but the critical extension would still be in place to show that the certificate was not meant to be used as part of a ring signature.

As will be appreciated, these activities may occur in a distributed ledger (e.g., a blockchain) or cloud environment. The ring usage certificate extension system's underlying signing mechanisms are based on cryptographic techniques that can be automated. A ring signature may be created through the use of a public and private key pair with one or more other acquired public keys (without need of the corresponding private keys). A message or other data block is signed with the private key and all the public keys to create a ring signature. The message may be sent along with all of the public keys. The message recipient may look at the public keys included and use them to verify the signature on the received message. Now when the recipient receives such a message, a ring signature that involves the PKI, the recipient may look at all of the certificates involved and try to validate the certificate path of each. Path validation may include tracing through a chain of certificates from each signed certificate all the way back to a trusted certificate authority that issued the certificate while validating the path contain certificates where there was ability to sign, that were not expired and that were not on a certificate revocation list.

Referring to FIG. 1, a schematic diagram of a ring usage certificate extension system 100 is shown, according to an example implementation. The system 100 includes a signing manager system 102, one or more user computing system(s) 104, one or more certificate authority system(s) 106, and a network 110. Each of the signing manager system 102, one or more user computing system(s) 104, one or more certificate authority system(s) 106, is in operative communication with one or more of the others via the network 110. The network 110 may include, for example, the Internet, cellular networks, proprietary banking networks, and the like.

Generally, the ring usage certificate extension system 100 may be used to generate a plurality of digitally signed data and/or an associated digital certificate directly or through a request to a separate server. Although various implementations may be described in connection with example systems and methods, it should be understood that the systems and methods described herein may similarly be used to provide digitally signed data with extensions in undescribed types of systems and methods, such as enterprise security and other types of systems. While the signing manager system 102, one or more user computing system(s) 104, and one or more certificate authority system(s) 106 are shown as separate entities in FIG. 1, in some implementations, the signing manager system 102 performs some of or all of the functions of the certificate authority system 106, as described herein. In some implementations, the user computing system 104 performs some of or all of the functions of the signing manager system 102 (e.g., the functions of the request analysis circuit 114). In some implementations, one or both of the signing manager system 102 and the certificate authority system 106 are managed and operated by a financial institution. However, in other implementations, one or both of the signing manager system 102 and the certificate authority system 106 are managed and operated by a third-party that is external to a financial institution or other organization.

The signing manager system 102 includes a network interface circuit 112 and a request analysis circuit 114. Generally, the signing manager system 102 is structured to receive requests for obtaining digital certificates, signing data and/or generating keys for signing data. The signing manager system 102 may, for example, include one or more servers each with one or more processors configured to execute instructions stored in a memory, send and receive data stored in the memory, and perform other operations to implement the ring usage certificate extension functions described herein. The network interface circuit 112 is structured to facilitate operative communication between the signing manager system 102 and other systems and devices over the network 110.

In some implementations, the request analysis circuit 114 is configured to analyze a request to determine if the request includes a request or instruction to prohibit a digital certificate created as a result of the request from being used as part of a ring signature. The request analysis circuit may also be configured to determine whether to prohibit the signature from being used as part of a ring signature. In some implementations, wherein the request includes a request or instruction to prohibit a digital certificate created as a result of the request from being used in a ring signature, the request analysis circuit 114 is configured to make a determination to prohibit the signature (and associated digital certificate) from being used as part of a ring signature. In some implementations, the request analysis circuit 114 is configured to prohibit the signature from being used as part of a ring signature is the default and the request must include an affirmative indication to not prohibit any resultant digital certificate from being used as part of a ring signature.

In some implementations, the request analysis circuit 114 is configured to set an extension (or submit a request to set an extension) to not disallow the signature to be used in a ring signature if there is a determination to not prohibit the signature from being used as part of a ring signature. For example, a user may explicitly want the option to use a public key certificate as part of a ring signature. The user will either not request prohibition from use as part of a ring signature or explicitly request to not have prohibition from use as part of a ring signature. In another example, the extension may always be included by an issuing Certificate Authority based on organizational policy, certification practice, and/or a Certification Practices Statement of the Certificate Authority. In such case, the requestor can ask for the Boolean value of the extension to be set to true or false in the certificate request.

In some implementations, the request analysis circuit 114 is configured to set an extension (or submit a request to set an extension) to disallow the signature to be used in a ring signature if there is a determination to prohibit the signature from being used as part of a ring signature. In some implementations, the issuance of the digital certificate (e.g., by a certificate authority system 106) includes a certificate extension to allow or disallow the certificate from being used in a ring signature. In some implementations, the certificate extension is set as a critical extension wherein the extension must be processed by a PKI. The PKI must be structured to understand and recognize that critical extension or it must fail and upon recognizing the critical extension it would be configured to examine the flag that says whether or not the ring signature can be performed and whether it should not be used in that context.

The user computing system 104 includes a network interface circuit 122 and a signing circuit 124. The user computing system 104 may, for example, include one or more processors configured to execute instructions stored in a memory, send and receive data stored in the memory, and perform other operations to implement the ring usage extension services described herein associated with the processing modules, databases, and processes. In some implementations, some or all of the signing manager system circuits is implemented or managed by the user computing system 104. The network interface circuit 132 is configured to facilitate operative communication between the user computing system 104 and other systems and devices over the network 110.

In some implementations, the signing circuit 124 is configured to send a request and a data payload with instructions to digitally sign the data payload and instructions to either prohibit or allow a digital certificate created as a result of the request from being used as part of a ring signature. In some implementations, the signing circuit 124 is configured to send requests with a prohibition of the signature from being used as part of a ring signature as the default and a user must affirmatively indicate a change to not prohibit any resultant digital certificate of the request from being used as part of a ring signature.

The certificate authority system 106 includes a network interface circuit 132 and a certificate circuit 134. The certificate authority system 106 may, for example, include one or more servers each with one or more processors configured to execute instructions stored in a memory, send and receive data stored in the memory, and perform other operations to implement the services described herein associated with the processing modules, databases, and processes. In some implementations, the certificate authority system 106 is configured to issue digital certificates. In one example, a digital certificate may certify the ownership of a public key by the named subject of the certificate. In some implementations, the format of these certificates may be specified by the X.509 standard. The network interface circuit 132 is configured to facilitate operative communication between the certificate authority system 106 and other systems and devices over the network 110. underlying signing mechanisms are based on cryptographic techniques that can be automated. A ring signature may be created through the use of a public and private key pair with one or more other acquired public keys (without need of the corresponding private keys). A message or other data block is signed with the private key and all the public keys to create a ring signature. The message may be sent along with all of the public keys. The message recipient may look at the public keys included and used them to verify the signature on the received message without gaining knowledge of the actual signer identity.

Figure 2:
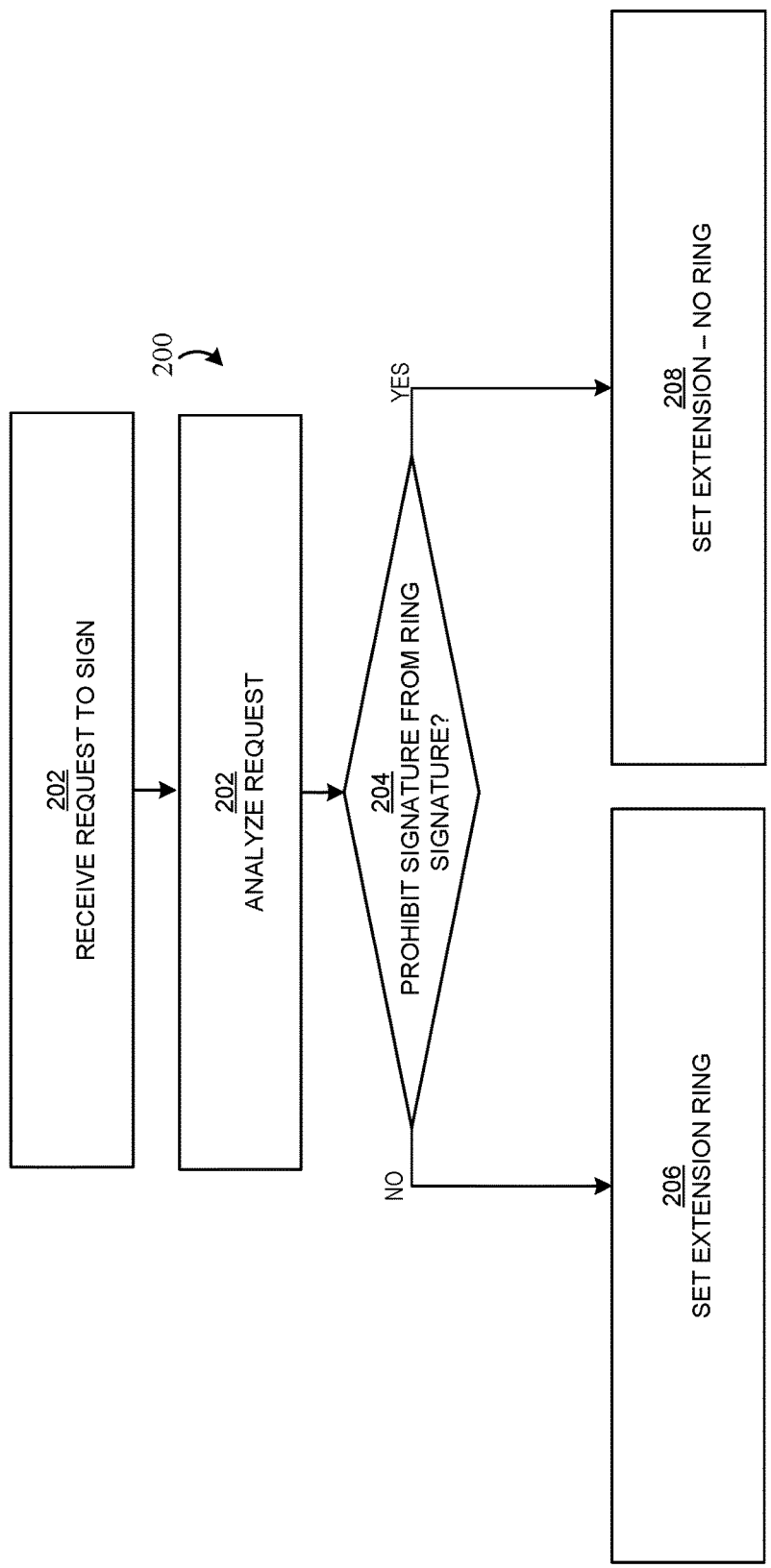
FIG. 2 is a flow diagram of a method of setting an extension of a request to sign, according to an example implementation.

Referring to FIG. 2, a flow diagram of a method 200 of setting an extension of a request to sign is shown, according to an example implementation. The method 200 is described in connection with receiving a request to sign data, for example by a certificate authority that is able to authenticate the request and issue a digital certificate. In some implementations, the method 200 is executed using a certificate authority system 106 (e.g., using the certificate circuit 134). In some implementations, this functionality may be part of the signing manager system 102. In brief, the method 200 includes receiving a request to sign, analyzing the request and determining if the request requires prohibiting the signature from being used in a ring signature. If the request requires prohibiting the signature from being used in a ring signature, an extension is set to disallow the signature from being used in a ring signature. If the request does not require prohibiting the signature from being used in a ring signature, an extension is not set to disallow the signature from being used in a ring signature.

The method 200 begins at 202 with receiving a request to sign. In some implementations, the request includes information needed to obtain a digital certificate such as a public key and the identity of the requestor. The request may include a request to obtain a digital certificate such that the certificate can be used in the confirmation or validation by a Certificate Authority that the public key contained in the certificate belongs to the person, organization, server or other entity noted in the certificate. For example, the Certificate Authority may be obligated to verify an applicant's credentials, such that the users and relying parties can trust the information in the certificates of the Certificate Authority. If the user trusts the Certificate Authority and can verify the Certificate Authority signature, than the user can have a certainty that a certain public key does indeed belong to whomever is identified in the certificate.

In some implementations, the request to sign is not associated with an already generated key pair including a public key and a matching private key. One or more key pairs for signing data associated with the request may be generated to be associated with a digital certificate in a PKI, for example the X.509 certificate. In those arrangements, a key pair is generated (the private/public key pair must be generated together as the private/public key pair are mathematically related) where the private key signs data and the public key verifies the signature created with the associated private key. In some implementations, the key pair is for submitting to a Certificate Authority (e.g., certificate authority system 106). In some implementations, the system executing the method (e.g., a signing manager system 102) is also the Certificate Authority system. The submission is for the purposes of the Certificate Authority to generate that public key certificate. In some arrangements, a public key certificate is retrieved from a commercial certificate authority and used to ascertain the public/private key pair. In other arrangements, an ephemeral public/private key pair is generated not associated with a digital certificate in a PKI.

At 202, the request is analyzed. In some implementations, the request is analyzed to determine if the request includes a request or instruction to prohibit a digital certificate created as a result of the request from being used as part of a ring signature. At 204, a determination is made whether to prohibit the signature from being used as part of a ring signature. In some implementations, wherein the request includes a request or instruction to prohibit a digital certificate created as a result of the request from being used in a ring signature, the determination is made to prohibit the signature from being used as part of a ring signature. In some implementations, the determination to prohibit the signature from being used as part of a ring signature is the default and the request must include an affirmative indication to not prohibit any resultant digital certificate from being used as part of a ring signature.

At 206, an extension is set to not disallow the signature to be used in a ring signature if the determination is made at 204 to not prohibit the signature from being used as part of a ring signature. For example, a user may explicitly want the option to use a public key certificate as part of a ring signature and will either not request prohibition from use as part of a ring signature of explicitly request to not have prohibition from use as part of a ring signature. At this point a digital certificate can be obtained or requested using the signature including a ring signature. One non-limiting example of creating the private keys for a ring signature may be (1) generate encryption with k=Hash(message), (2) generate a random value (x), (3) encrypt x to give v=Ek(x), (4) For each person (apart from the sender): calculate e=Ri^{Pi} (mod Ni) and where Ri is the random number generated for the secret key of the i-th party, and Pi is the public key of the party and calculate v=v⊕e, (5), For the signed party (z), calculate sz=(v⊕u)^d (mod Nz) and where d is the secret key of the signing party to end up with v=Ek(u)), and which completes the ring.

At 208, an extension is set to disallow the signature to be used in a ring signature if the determination is made at 206 to prohibit the signature from being used as part of a ring signature. In some implementations, the issuance of the digital certificate (e.g., by a certificate authority system 106) includes a certificate extension to allow or disallow the certificate from being used in a ring signature. In some implementations, the certificate extension is set as an extension wherein the extension must be processed by the PKI. The PKI must be configured to understand and recognize that critical extension or it must fail and upon recognizing the critical extension it would be configured to examine the flag that says whether or not the ring signature can be performed and whether it should not be used in that context.

At this point the signature can be used to obtain a digital certificate but if the digital certificate and associated signature is attempted to be used as part of a ring signature from a certificate authority that recognizes the ring usage extension, then that certificate authority will fail validation.

Figure 3:
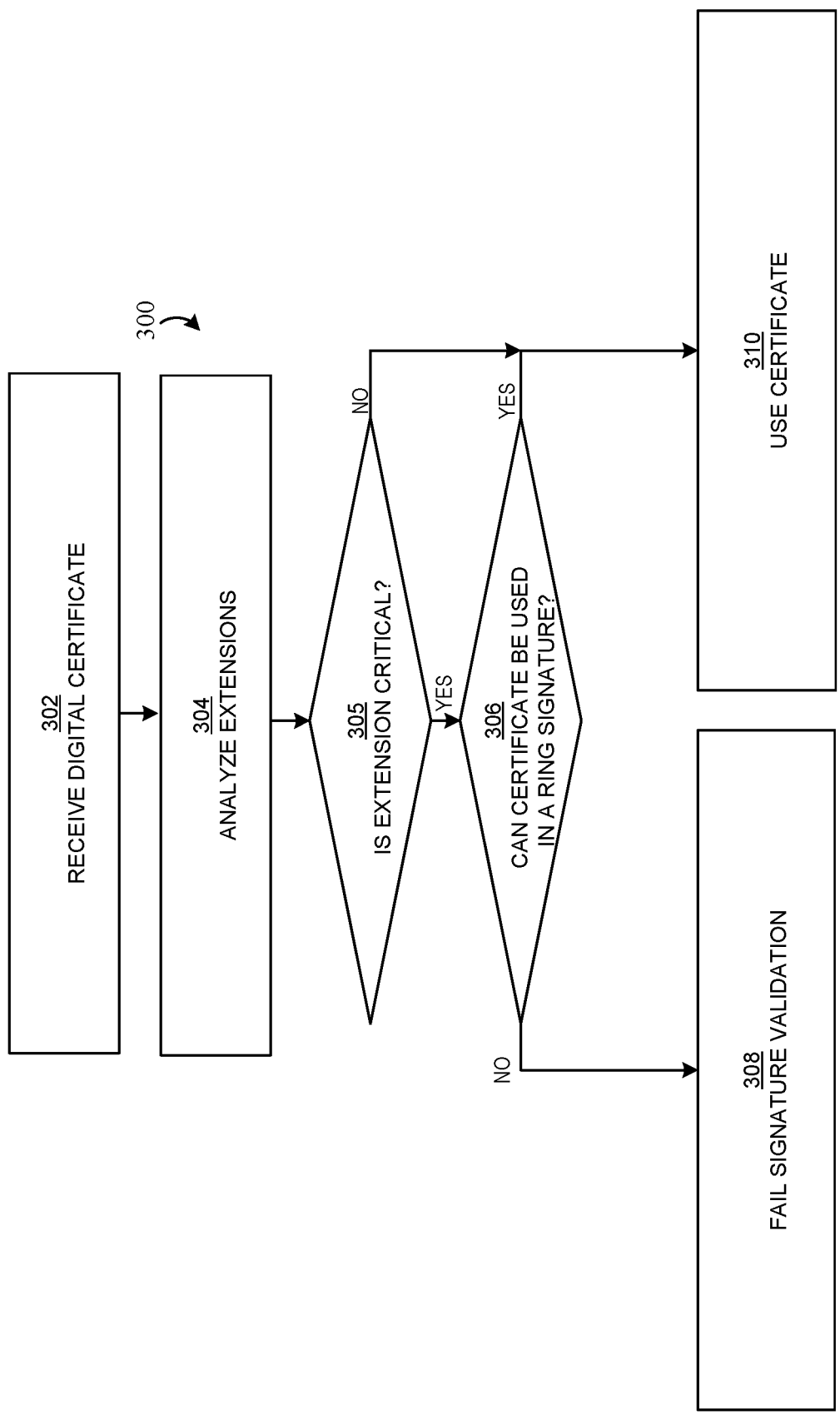
FIG. 3 is a flow diagram of a method of receiving a digital certificate, according to an example implementation.

Referring to FIG. 3, a flow diagram of a method 300 of receiving a digital certificate is shown, according to an example implementation. In some implementations, the method 300 is executed using a certificate authority system 106. In brief, method 300 includes receiving a digital certificate and analyzing any extensions of the received digital certificate. If the certificate can be used as part of a ring signature, the certificate is validated as part of a ring signature. If the certificate cannot be used as part of a ring signature, the certificate fails validation as part of a ring signature. For example, each signature may be verified or validated by a certificate authority by applying the respective digital certificate to the signed data by (1) applying the public key trap door, (2) calculating the symmetric key, and (3) verifying that the ring equation holds.

Still referring to FIG. 3, at 302, a digital certificate is received. In some implementations, the digital certificate is received as part of a request to validate a ring signature with an associated data. For example, a plurality of digital certificates may be received with each having to be validated to determine that a private key associated with one of the plurality of digital certificates was used to sign the associated data.

Figure 4:
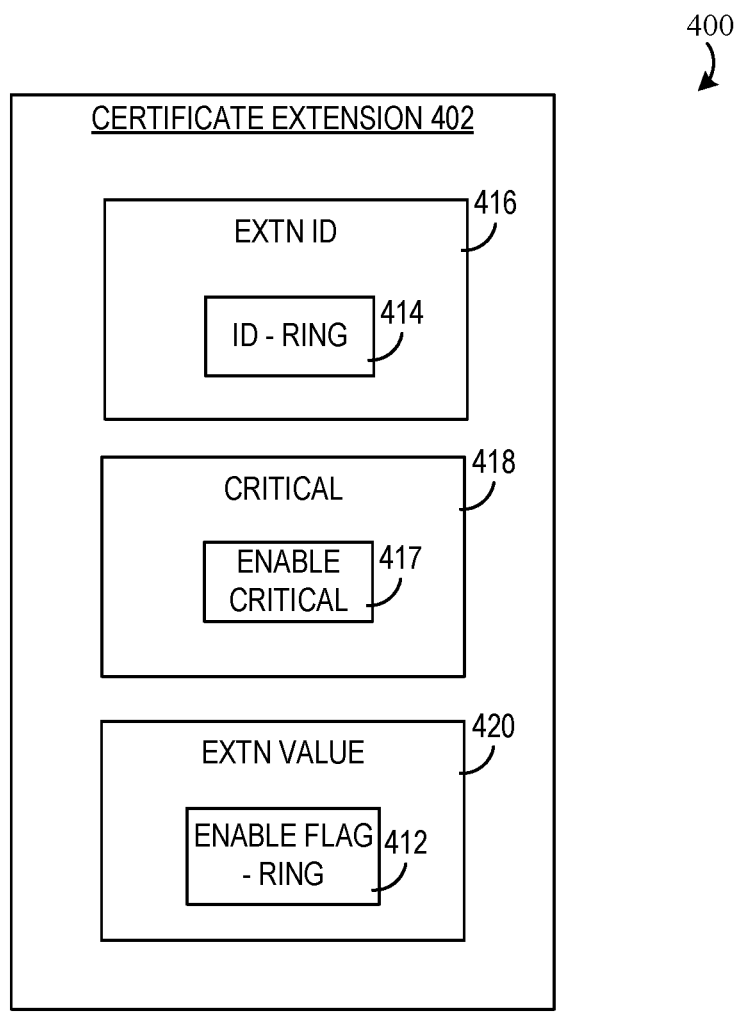
FIG. 4 is a schematic diagram of a certificate extension model, according to an example implementation.

At 304, the extensions of the digital certificate are analyzed. In some implementations, the analysis checks to see if the digital certificate contains a ring usage certificate extension. In some implementations, components of the ring usage certificate extension may include at least an Enable Flag and an ID-Ring. See FIG. 4 for more detail. The ring usage certificate extension may be set as a critical extension.

At 305, a determination is made if the ring usage certificate extension is set as a critical extension. In some implementations, if the ring usage certificate extension is not set as critical then the certificate may be used to verify signed data at 310. The determination may be made by checking a second Boolean value of the extension identifying the extension as critical for processing. In some implementations, if the extension is not identified as critical, then some entities may choose to ignore the extension during processing. See FIG. 4 for more detail.

At 306, a determination is made whether the certificate can be used in a ring signature. In some implementations, where a critical extension is determined to be part of the digital certificate, the values associated with the critical extension is determined. For example, a determination may be made that an Enable Flag in the critical extension identified as a Boolean value has been set. In some implementations, the Enable Flag may be set to TRUE to enable the use of the digital certificate as part of a ring signature. Further, the Enable Flag may be set to FALSE to disable the use of the digital certificate as part of a ring signature. If any digital certificate in the certificate path validation chain is set to disable the use as part of a ring signature from the plurality of digital certificates received, the system may properly fail the entire validation or verification process.

At 308, a signature validation is failed in response to determining at 306 that the certificate is not to be used in a ring signature. In some implementations, where a critical extension is determined to be part of the digital certificate, the values associated with the critical extension is determined. For example, a determination may be made that an Enable Flag in the critical extension identified as a Boolean value has been set. In some implementations, the Enable Flag may be set to TRUE to enable the use of the digital certificate as part of a ring signature. Further, the Enable Flag may be set to FALSE to disable the use of the digital certificate as part of a ring signature. If any digital certificate is set to disable the use as part of a ring signature from the plurality of digital certificates received, the system may properly fail the entire validation or verification process.

At 310, the certificate may be used to validate a signature despite being used as part of a ring signature if it is determined at 306 that the certificate is not prohibited from use in a ring signature. In some implementations, the allowed use is based on a determination that a critical extension is part of the digital certificate and that a value associated with the critical extension is determined. For example, a determination may be made that an Enable Flag in the critical extension identified as a Boolean value has been set. In some implementations, the Enable Flag may be set to TRUE to enable the use of the digital certificate as part of a ring signature. Further, the Enable Flag may be set to FALSE to disable the use of the digital certificate as part of a ring signature. If any digital certificate is set to disable the use as part of a ring signature from the plurality of digital certificates received, the system may properly fail the entire validation or verification process Referring to FIG. 4, a block diagram 400 of a certificate extension model is shown, according to an example implementation. The block diagram 400 includes a certificate extension 402 including components. The components may include, for example, at least an Enable Flag-Ring 412 and an ID-Ring 414. The components may further include such components as an Extn ID 416, Critical 418, and/or Extn Value 420. As a non-limiting example, the extension may be defined as follows:

ringUsage EXTENSION::=
        SYNTAX RingUsage
        IDENTIFIED BY id-ce-ringUsage
    }

The certificate extension 402 includes an Enable Flag-Ring 412, an ID-Ring 414, and an Enable Critical 417. As a non-limiting example, the extension may be defined as follows:

RingUsage::=SEQUENCE
        ringEnabled RingEnabled,
        copyright UTF8String (SIZE(1 . . . MAX)) OPTIONAL
    }
    RingEnabled::=BOOLEAN
    id-ce-ringUsage::=1 2 3 4—Example value In some implementations, for each certificate that includes this ringUsage certificate extension, the value of the ringEnabled component of type RingUsage controls whether or not the certificate is intended for use in a ring signature. To enable the use in a ring signature, for example, the value RingEnabled may be set to TRUE. To disable the use in a ring signature, the value RingEnabled may be set to FALSE. An optional string may allow a copyright to be asserted in the certificate using any national language. In some implementations, if a Certificate Authority has issued a certificate that includes this ringUsage certificate extension, the value of the ringEnabled component of type RingUsage indicates its suitability for use. For example if the value is set to FALSE, then the certificate cannot be used as part of a ring signature by either a signer or non-signer. If the value is set to TRUE, then the certificate may be used in a ring signature by either a signer or non-signer.

The certificate extension 402 may include an Extn ID 416, a Critical 418, and an Extn Value 420. As a non-limiting example, as defined in the X.509 AuthentificationFramework module, the extension may further be defined as follows:

Extension::=SEQUENCE
        extnId EXTENSION.&id({ExtensionSet}),
        critical BOOLEAN DEFAULT FALSE,
        extnValue OCTET STRING
    {—Contains a DER encoding of a value of type &ExtnType
    ExtensionSet EXTENSION::={ . . . }
    EXTENSION::=CLASS
        &id OBJECT IDENTIFIER UNIQUE,
        &ExtnType
    }

In some implementations, in order for the ringUsage extension to be enforced by a Certificate Authority, for example, the critical component (e.g., Boolean Critical) of type Extension must be set to TRUE. In other words, a value of TRUE requires that any user of the certificate must fail certificate verification and path validation processing and treat an associated signature as invalid if it does not recognize the extension type or if it is unable to process the extension.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may include or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the implementations might include a general purpose computing computers in the form of a computer, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and arrangement of the implementations without departing from the scope of the present disclosure as expressed in the appended claims.

What is claimed:

1. A certificate authority system, comprising:
a network interface circuit configured to:
  receive a request to validate; and
  receive a plurality of digital certificates associated with the request to validate; and
a certificate circuit configured to:
  determine the request to validate requires validation of a ring signature using the plurality of digital certificates;
  determine one or more of the plurality of digital certificates comprises a ring usage certificate extension;
  determine the ring usage certificate extension is identified as critical;
  in response to the determination that the ring usage certificate extension is identified as critical, analyze the ring usage certificate extension and retrieve a value associated with the ring usage certificate extension; and
  fail validation of the request based on determining the request to validate requires validation of the ring signature and based on the value associated with the ring usage certificate extension,
  wherein the failed validation indicates that at least one of the one or more of the plurality of digital certificates are rejected to be used as a part of the ring signature.

2. The certificate authority system of claim 1, wherein determining one or more of the plurality of digital certificates comprises the ring usage certificate extension comprises:

determining that the one or more of the plurality of digital certificates comprises an extension;
determining that the extension comprises an identification label identifying the extension as the ring usage certificate extension; and
determining that the extension further comprises an associated Boolean value.

3. The certificate authority system of claim 2, wherein the extension comprises a second Boolean value identifying the extension as critical.

4. The certificate authority system of claim 1, the network interface circuit further configured to transmit an indication of the failed validation to a computing system associated with a requestor of the request to validate.

5. The certificate authority system of claim 4, wherein the indication of the failed validation comprises information that the failed validation was associated with the ring usage certificate extension of one or more of the plurality of digital certificates.

6. The certificate authority system of claim 1, the certificate circuit configured to store a log entry of the failed validation, the log entry comprising data associated with the request and the one or more of the plurality of digital certificates comprising the ring usage certificate extension.

7. The certificate authority system of claim 1, wherein validation is successful as a ring signature except for the value associated with the ring usage certificate extension.

8. A method, executing on a certificate authority computing system,
the method comprising:
receiving a request to validate;
receiving a plurality of digital certificates associated with the request to validate;
determining the request to validate requires validation of a ring signature using the plurality of digital certificates;
determining one or more of the plurality of digital certificates comprises a ring usage certificate extension;
determining the ring usage certificate extension is identified as critical;
in response to the determination that the ring usage certificate extension is identified as critical, analyzing the ring usage certificate extension and retrieving a value associated with the ring usage certificate extension; and
failing validation of the request based on determining the request to validate requires validation of the ring signature and based on the value associated with the ring usage certificate extension,
wherein the failed validation indicates that at least one of the one or more of the plurality of digital certificates are rejected to be used as a part of the ring signature.

9. The method of claim 8, wherein determining one or more of the plurality of digital certificates comprises the ring usage certificate extension comprises:
determining that the one or more of the plurality of digital certificates comprises an extension;
determining the extension comprises an identification label identifying the extension as the ring usage certificate extension; and
determining the extension further comprises an associated Boolean value.

10. The method of claim 9, wherein the extension comprises a second Boolean value identifying the extension as critical.

11. The method of claim 8, further comprising transmitting an indication of the failed validation to a computing system associated with a requestor of the request to validate.

12. The method of claim 11, wherein the indication of the failed validation comprises information that the failed validation was associated with the ring usage certificate extension of one or more of the plurality of digital certificates.

13. The method of claim 8, further comprising storing a log entry of the failed validation, the log entry comprising data associated with the request and the one or more of the plurality of digital certificates comprising the ring usage certificate extension.

14. The method of claim 8, wherein validation is successful as a ring signature except for the value associated with the ring usage certificate extension.

15. A non-transitory computer-readable storage media storing instructions that are executable by one or more processors to perform operations comprising:
receiving a request to validate;
receiving a plurality of digital certificates associated with the request to validate;
determining the request to validate requires validation of a ring signature using the plurality of digital certificates;
determining one or more of the plurality of digital certificates comprises a ring usage certificate extension;
determining the ring usage certificate extension is identified as critical;
in response to the determination that the ring usage certificate extension is identified as critical, analyzing the ring usage certificate extension and retrieving a value associated with the ring usage certificate extension; and
failing validation of the request based on determining the request to validate requires validation of the ring signature and based on the value associated with the ring usage certificate extension,
wherein the failed validation indicates that at least one of the one or more of the plurality of digital certificates are rejected to be used as a part of the ring signature.

16. The non-transitory computer-readable storage media of claim 15, wherein determining one or more of the plurality of digital certificates comprises the ring usage certificate extension comprises:
determining that the one or more of the plurality of digital certificates comprises an extension;
determining the extension comprises an identification label identifying the extension as the ring usage certificate extension; and
determining the extension further comprises an associated Boolean value.

17. The non-transitory computer-readable storage media of claim 16, wherein the extension comprises a second Boolean value identifying the extension as critical.

18. The non-transitory computer-readable storage media of claim 15, the instructions further comprising transmitting an indication of the failed validation to a computing system associated with a requestor of the request to validate.

19. The non-transitory computer-readable storage media of claim 18, wherein the indication of the failed validation comprises information that the failed validation was associated with the ring usage certificate extension of one or more of the plurality of digital certificates.

20. The non-transitory computer-readable storage media of claim 15, the instructions further comprising storing a log entry of the failed validation, the log entry comprising data associated with the request and the one or more of the plurality of digital certificates comprising the ring usage certificate extension.

\* \* \* \* \*